United States Patent [19]

Edmisson

[11] Patent Number: 4,628,839
[45] Date of Patent: Dec. 16, 1986

[54] FERTILIZER APPLICATOR KNIFE ASSEMBLY

[75] Inventor: Delmar D. Edmisson, Guymon, Okla.

[73] Assignee: Adams Hard-Facing Company, Inc.

[21] Appl. No.: 699,169

[22] Filed: Feb. 7, 1985

[51] Int. Cl.⁴ ............................................. A01C 23/02
[52] U.S. Cl. ......................................... 111/7; 172/699
[58] Field of Search ............... 172/719, 753, 745, 764, 172/713, 699, 700, 727, 728; 111/6, 7

[56] References Cited

U.S. PATENT DOCUMENTS

| | | | |
|---|---|---|---|
| 2,148,925 | 2/1939 | Bochy | 172/745 |
| 2,684,617 | 7/1954 | Johnston | 172/699 |
| 3,919,951 | 11/1975 | Williams | 111/7 |
| 4,132,181 | 1/1979 | Smith | 111/7 |
| 4,201,142 | 5/1980 | Stump | 172/699 |
| 4,355,589 | 10/1982 | Wetmore | 111/7 |

OTHER PUBLICATIONS

Adams Tillage Tools-advertizing brochure of Adams Hard-Facing Co., Inc., Guymon, Okla., pp. 1, 16, 1/1979.

Primary Examiner—Richard J. Johnson
Attorney, Agent, or Firm—Laney, Dougherty, Hessin & Beavers

[57] ABSTRACT

A fertilizer applicator knife assembly including an elongated blade shank having a concave leading edge and a concave trailing edge with a fertilizer tube attached to the trailing edge. An arcuate wear insert of hard metal is attached to the leading edge of the blade shank near the lower end thereof. The wear insert has a pair of convergent side surfaces which converge in a radiused leading edge, and also has a head at its lower end which carries a generally triangularly shaped spur which projects downwardly and rearwardly from said head to hook under the forward lower end of the blade shank.

10 Claims, 5 Drawing Figures

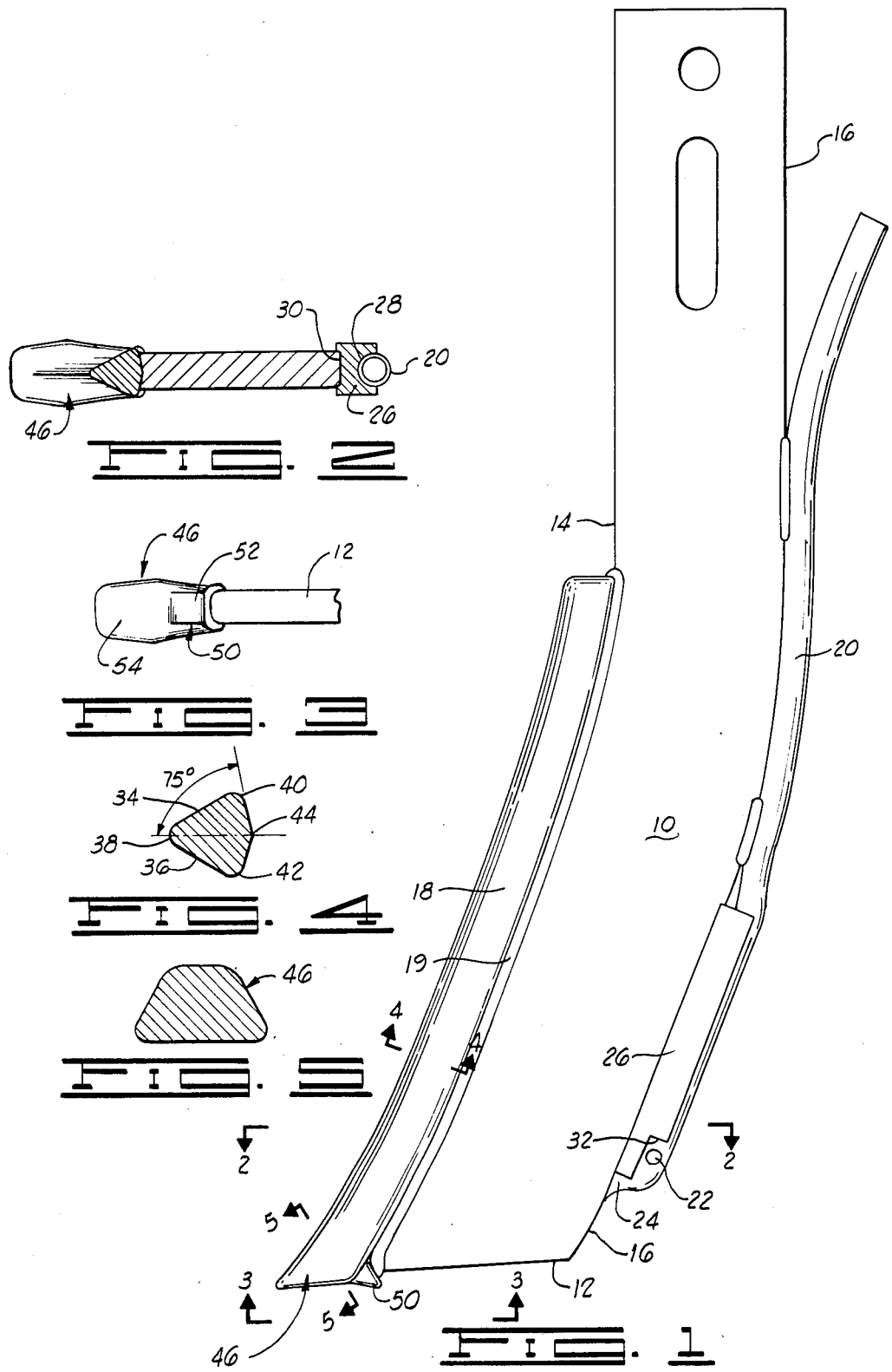

FERTILIZER APPLICATOR KNIFE ASSEMBLY

BACKGROUND OF THE INVENTION

1. Field of the Invention

This invention relates to agricultural implements used to apply fertilizer to a subsoil location, and more particularly, to an applicator knife for placing a fluid fertilizer, such as anhydrous ammonia, in a furrow or trench as it is formed. Yet more specifically, the invention relates to an insert which is secured to the shank of a fertilizer knife to form a portion of the leading edge thereof, which insert is especially shaped and fabricated to provide an effective cutting action where stalks, stubble and trash are to be traversed by the fertilizer applicator knife during use.

2. Brief Description of the Prior Art

The use of liquid and gaseous fertilizer materials for enhancing the productivity of soils is a widespread agricultural practice. One of the most widely used fertilizer compositions employed is anhydrous ammonia. This highly nitrogenous fertilizer is applied to the soil by delivering it as a fluid through an elongated tube which extends down the rear side of the shank of a knife utilized to form a furrow or trench in the soil. In the described arrangement, the fertilizer tube is partially protected by its position on the rear or trailing side of the knife blade shank. At the forward or leading side of the knife blade shank, the shank carries a hard metal insert which is welded to the leading edge of the shank, and is configured so as to provide a relatively sharp edge which is capable of cutting through the soil for the formation of the furrow or trench into which the fertilizer is to be deposited.

An important consideration in the construction and utilization of such fertilizer applicator knives is the service life which can be expected of such knives before they must be replaced on the implement to which the knives are bolted during use. In very hard and abrasive soils, the wearing and cutting of the metal forming the applicator blade is severe, and unless some special provision is made to accommodate this abrasion during usage of the tool, the service life becomes unacceptably short, and the expense of replacement at frequent intervals quite high.

In U.S. Pat. No. 4,355,589, assigned to the assignee of the present application, one type of fertilizer applicator knife assembly is illustrated, and such knife assembly carries a wear insert at the leading side of the knife shank. The insert is made of a very hard and abrasion-resistant metal, such as chromium carbide. It is beveled or tapered to a relatively narrow edge at its front or leading edge to provide a cutting action as the knife assembly is forced through the soil during application of the fertilizer.

Other types of hard metal inserts for similar usage at the leading side of a fertilizer applicator knife blade are illustrated in Smith et al U.S. Pat. No. 4,132,181; Stump U.S. Pat. No. 4,201,142; Williams U.S. Pat. No. 4,033,271; Horton U.S. Pat. No. 3,259,087; Johnston U.S. Pat. No. 2,684,617 and Ronck et al U.S. Pat. Des. No. 262,972.

A copy of a brochure which illustrates a typical prior arrangement, as manufactured and sold by the assignee of the present invention, is submitted with the Information Disclosure Statement which is filed concurrently with the present application.

BRIEF DESCRIPTION OF THE PRESENT INVENTION

The present invention comprises a fertilizer applicator knife assembly which includes a curved blade shank having a convex leading edge to which is mounted, preferably by welding, a wear insert of hardened metal and special configuration. At the convex rear or trailing edge of the curved blade shank, an elongated fertilizer tube is secured, and passes over a spacer which is secured to the rear of the shank at a location relatively near to the foot or lower end of the shank. The general arrangement described is that which is shown in U.S. Pat. No. 4,355,589, assigned to the assignee of the present invention.

The wear insert utilized in the fertilizer applicator knife assembly of the present invention, and which is secured to the forward end of the blade shank, is of special configuration to greatly increase the wear which the wear insert will sustain, and to afford a longer protective life for the blade shank. Moreover, the wear insert has a configuration which permits it to easily cut through stalks, stubble and trash which tend to wrap around the shank portion of the knife.

The wear insert is a curved or arcuate elongated hard metal body having a generally triangular cross section over its length, and carrying at its lower end, which is also its leading end as it is mounted on the blade shank, a flared head which, at its widest transverse dimension, is about one and one-half to one and three-fourths times wider than the principal shank portion of the wear insert. The elongated shank of the wear insert is formed on a radius which will cause the edge to wear sharp over extended periods of usage. The head of the wear insert is also tapered on a radius which causes the point to wear sharp. The flared width of the head allows a wider zone of soil fracture into which liquid fertilizer can be applied. The wider point also affords an extended and longer wear life for the entire insert, and for the blade shank to which it is secured.

An important object of the present invention is to provide an improved fertilizer applicator knife assembly which offers an extended and relatively longer service life than similar applicator knife assemblies.

An additional object of the invention is to provide a specially-shaped wear insert for securement to the leading edge of the knife blade of a fertilizer applicator knife assembly, which wear insert is configured to provide highly effective cutting action allowing the applicator knife assembly to cut through stalks, stubble and trash accumulated on the surface of the ground and for a short depth therebelow, while forming a widened trench to receive anhydrous ammonia fertilizer applied to a depth in the ground by means of the applicator knife assembly.

Another object of the invention is to provide a fertilizer applicator knife assembly which is equipped with a hard metal wear insert carried on the leading edge of the applicator knife assembly, which wear insert, by reason of its geometric configuration, tends to become sharper over extended periods of use, and thus to become enhanced in its cutting effectiveness.

Additional objects and advantages will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of the fertilizer applicator knife assembly of the invention.

FIG. 2 is a sectional view taken along line 2—2 of FIG. 1.

FIG. 3 is a view along line 3—3 of FIG. 1.

FIG. 4 is a sectional view taken along line 4—4 of FIG. 1.

FIG. 5 is a sectional view taken along line 5—5 of FIG. 1.

DETAILED DESCRIPTION OF A PREFERRED EMBODIMENT OF THE INVENTION

The fertilizer applicator knife assembly of the invention includes an elongated blade shank 10 which has a foot 12 at its lower end, and is further characterized in having a leading edge 14 and a trailing edge 16. Adjacent the foot 12 of the shank 10, a hard metal wear insert 18 is welded to the leading edge of the shank 10 by means of weld metal 19. The insert 18 and the weld metal 19 employed to weld it to the shank 10 are preferably a very hard and abrasion-resistant metal, such as chromium carbide.

Extending down the trailing edge 16 of the blade shank 10 from a tank or other source (not shown) mounted on a tractor upon which the implement provided with the knife assembly is carried is an elongated fertilizer tube 20. The fertilizer tube 20 is a hollow tube used to convey the fluid fertilizer to a point adjacent the foot 12 of the shank 10. At its lower end, the tube 20 is provided with a pair of opposed lateral discharge holes 22 through which the fertilizer is discharged into a groove or trench formed as the applicator knife assembly is pulled through the soil. The bottom of the tube below these holes 22 is closed. At its lower end, the tube 20 is secured to the trailing edge 16 of the shank 10 by a weld 24.

The tube 20 is protected from abrasive wear and shock forces developed from impact with rocks, roots or other objects in the soil by a protective spacer 26. The protective spacer 26 is an elongated bar of very hard metal, and has a generally rectangular cross section as shown in FIG. 2. At the rear side of the spacer an elongated groove 28 is formed in the spacer to receive the lower portion of the tube 20. The forward side of the spacer 26 is provided with a rectangular relief or recess 30 dimensioned to accept the trailing edge 16 of the blade shank 10. Adjacent its the lower end, the spacer 26 is relieved by the formation of a pair of rectangular notches 32 in opposite sides of the spacer so as to expose the lateral discharge holes 22 in the tube 20. The configuration of the notches 32 functions to protect the discharge openings 22, both from ahead and above, from soil impaction and plugging.

The elongated hard metal wear insert 18 is configured to provide for extended service life and efficient cutting through the soil, including stalks, stubble and trash on the surface and embedded in the soil. The sectional configuration of the shank of the insert 18 is illustrated in FIG. 4 of the drawings. The insert shank includes a pair of converging side surfaces 34 and 36 which converge at a radiused leading edge 38. Typically, the leading edge 38 of the insert 18 will be formed on a radius of from one-sixteenth to one-eighth inch. The insert shank has a maximum lateral width of from about one-half inch to three-quarters inch.

At its trailing edge 44, the insert 18 includes a pair of trailing edge convergent surfaces 40 and 42 which extend at an angle of from about 65° to about 80° with respect to the fore and aft center line drawn through the center of the insert 18. In the preferred embodiment illustrated in FIG. 4, this angle is 75°. The surfaces 40 and 42 converge to a very slightly radiused rear or trailing edge 44.

The length of the hard metal wear insert 18 is from about six inches to about twelve inches, depending upon the size of implement to which the insert is attached. In the illustrated embodiment, an insert is illustrated having a typical overall length of eight inches. As shown in FIG. 1, the insert 18 is arcuate in longitudinal configuration, having a concave leading edge and a convex trailing edge. The leading edge and trailing edge, 38 and 44, respectively, of the insert 18 are formed on radii, in the sense of the length dimension of the insert, of between fifteen inches and seventeen inches.

At its lower end where the insert 18 is adjacent the foot 12 of the shank 10, the insert is flared outwardly to an enlarged head 46. The enlarged head 46 has a maximum transverse width at its greatest thickness of from about three-quarters inch to about one and one-half inches. A preferred maximum width is about one and one-sixteenth inches. In my embodiment, this greatest width of the head is from about one and one-half to about one and three-fourths times the maximum lateral width of the insert shank. At the described location on the head 46 where the head is at its greatest thickness, the crossectional configuration of the head 46 is trapezoidal as shown in FIG. 5.

Secured to the lower, back side of the head 46 is a rearwardly projecting, triangularly cross-sectioned spur 50. The spur 50 includes a rectangular sole surface 52 which, as shown in FIGS. 1 and 3, extends at an angle to the bottom surface 54 of the head 46. The angle at which the sole surface 52 of the spur 50 extends to the bottom surface 54 of the head 46 is between about 150° and 170°. As illustrated in FIG. 3, the spur 50 has a width which is about one-half the width of the greatest thickness or transverse width dimension of the foot 46. The spur 50 extends back and down and hooks under the leading edge 14 of the blade shank 10 as shown in FIG. 1. It thus affords protection to the foot 12 of the blade shank 10 during use of the fertilizer applicator knife assembly.

In operation, a fertilizer applicator knife assembly, along with other similar knife assemblies, are mounted on a tool bar or frame which permits the implement to be mounted behind, and towed by, an agricultural tractor. In use, the fertilizer applicator knife assembly is pulled horizontally through the earth after it has penetrated the earth to a depth ranging from about one foot to about three feet. As the assembly moves through the earth, the leading edge 14 of the blade shank 10, along with the hard metal wear insert 18, cuts through the earth and provides a trench or furrow into which a fertilizer such as anhydrous ammonia can be deposited from the tube 20. The broad head 46 carried at the lower end of the insert 18 forms a wide trench, and the particular cross-sectional configuration of this head assures that as the assembly is used, the leading edge 38 of the insert shank wears sharp. The leading edge 38 of the insert 18 is configured so that it can easily cut through stalks, stubble and trash as the assembly is pulled through the earth.

Although a preferred embodiment of the invention has been herein described in order to illustrate the principles which underlie the invention, it will be understood that various changes and innovations in the described embodiment can be effected without departure from these basic principles. Changes and innovations of this type are therefore deemed to be circumscribed by the spirit and scope of the invention, except as the same may be necessarily limited by the appended claims or reasonable equivalents thereof.

What is claimed is:

1. A fertilizer applicator assembly comprising:
   an elongated blade shank having a concave leading edge and a convex trailing edge;
   a fertilizer tube attached to said trailing edge; and
   a wear insert welded to a portion of the leading edge, said wear insert including:
      an arcuate, elongated insert shank portion having a leading edge and a trailing edge, said insert shank portion further including a pair of convergent side surfaces converging toward said leading edge and each rounded into said leading edge on a radius of between about one-eighth inch and about one-fourth inch;
      a head carried on the lower end of said insert shank portion and flaring transversely to a thickness width about one and one-half to one and three-fourths the maximum lateral width of said insert shank portion, said head including a substantially flat lower surface; and
      a generally triangularly shaped spur projecting downwardly and rearwardly from said head and insert shank portion from a location at the intersection of the trailing edge of the insert shank portion and said flat, lower surface, said spur being configured and positioned to hook under the forward lower end of said blade shank, and said spur having a transverse thickness of from about one-half to about three-fourths the transverse thickness of said head at the thickest portion of said head.

2. A fertilizer applicator assembly as defined in claim 1 wherein said shank is further characterized in having a pair of trailing edge convergent surfaces which intersect in the trailing edge of the insert shank portion, and each of which intersects one of said side surfaces.

3. A fertilizer applicator assembly as defined in claim 1 wherein said triangular shaped spur is further characterized in having a rectangular sole surface which extends at an angle of from about 150° to about 170° to the substantially flat lower surface of said head.

4. A fertilizer applicator assembly as defined in claim 1 and further characterized as including a protective spacer positioned between said fertilizer tube and the trailing edge of said blade shank.

5. A fertilizer applicator assembly as defined in claim 1 wherein said head has a trapezoidal cross-sectional configuration in a plane through its location of maximum thickness width.

6. A fertilizer applicator assembly as defined in claim 2 wherein said triangular shaped spur is further characterized in having a rectangular sole surface which extends at an angle of from about 150° to about 170° to the substantially flat lower surface of said head.

7. A fertilizer applicator assembly as defined in claim 2 and further characterized as including a protective spacer positioned between said fertilizer tube and the trailing edge of said blade shank.

8. A fertilizer applicator assembly as defined in claim 6 wherein said head has a trapezoidal cross-sectional configuration in a plane through its location of maximum thickness width.

9. A fertilizer applicator blade assembly comprising:
   an elongated blade shank having a concave leading edge, a convex trailing edge, an upper end and a lower end;
   a fertilizer tube extending downwardly along said blade shank and attached to said trailing edge; and
   a hardened metal wear insert secured to the lower portion of said blade shank at the leading edge thereof, said insert including:
      an arcuate, elongated insert shank portion having a radiused leading edge, a trailing edge and a pair of opposed side surfaces diverging from each other rearwardly from said leading edge;
      an enlarged head on the lower end of said insert shank portion and flaring transversely to a maximum thickness width which is from about one and one-half to one and three-fourths the maximum transverse width of said insert shank portion at the locus of greatest divergence of said side surfaces, said head including a substantially flat lower surface and having a trapezoidal cross-sectional configuration in a plane through its location of maximum thickness width; and
      a generally triangularly cross-sectioned spur extending downwardly and rearwardly from the lower, back side of the head at the location where the flat lower surface of said head intersects said trailing edge of said insert, said spur having a rectangular sole surface, and said spur being configured and positioned to extend lower than, and rearwardly with respect to, the forward lower end of said blade shank to hook under the forward, lower end of said blade shank, said spur having a dimension in the rearwardly extending direction which does not exceed the distance between the leading edge and the trailing edge of said shank portion, said spur having a transverse width, as measured along a line extending parallel to the line defining the maximum thickness of said head, which is about one-half the maximum transverse thickness width dimension of said head.

10. A fertilizer applicator knife assembly comprising:
    an elongated blade shank having a concave leading edge, a trailing edge, an upper end and a lower end;
    a fertilizer tube extending downwardly along said blade shank at the trailing edge thereof; and
    a hardened metal wear insert secured to the lower portion of said blade shank at the leading edge thereof, said insert including:
       an elongated shank portion having a radiused leading edge, a trailing edge and a pair of opposed side surfaces diverging from each other rearwardly from said leading edge;
       an enlarged head on the lower end of said insert shank portion and flaring transversely to a thickness which is over one and one-half times the maximum transverse width of the insert shank portion of the wear insert, said head including a substantially flat lower surface; and
       a generally triangularly cross-sectioned spur projecting downwardly and rearwardly from said head and insert shank portion from a location at the intersection of the trailing edge of said insert shank portion and said flat, lower surface, said spur being positioned and configured to hook under the forward lower end of said blade shank, and said spur having a transverse thickness which is from about one-half to about three-fourths the transverse thickness of said head at the thickest portion of said head.

* * * * *